US010830583B2

(12) United States Patent
Roithmeier et al.

(10) Patent No.: US 10,830,583 B2
(45) Date of Patent: Nov. 10, 2020

(54) METHOD FOR CREATING A MEASUREMENT PROTOCOL AND COMPUTER FOR PERFORMING THE SAME

(71) Applicant: Carl Zeiss Industrielle Messtechnik GmbH, Oberkochen (DE)

(72) Inventors: Robert Roithmeier, Seehausen am Staffelsee (DE); Udo Kirin, Schwaebisch Gmuend (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 650 days.

(21) Appl. No.: 15/418,468

(22) Filed: Jan. 27, 2017

(65) Prior Publication Data

US 2017/0138726 A1 May 18, 2017

Related U.S. Application Data

(63) Continuation of application No. PCT/EP2015/064338, filed on Jun. 25, 2015.

(30) Foreign Application Priority Data

Jul. 28, 2014 (DE) .................... 10 2014 214 771

(51) Int. Cl.
*G01B 11/03* (2006.01)
*G01B 21/04* (2006.01)
(Continued)

(52) U.S. Cl.
CPC ......... *G01B 21/042* (2013.01); *G05B 19/401* (2013.01); *G05B 23/0272* (2013.01);
(Continued)

(58) Field of Classification Search
CPC ...... G01B 21/042; G01B 5/008; G01B 9/401; G01B 11/03; G05B 19/401; G05B 23/0272; G05B 2219/37193; G05B 2219/37211
See application file for complete search history.

(56) References Cited

U.S. PATENT DOCUMENTS 6,610,992 B1 * 8/2003 Macaulay ............... G01B 11/00 250/559.22
6,612,044 B2 * 9/2003 Raab .................. G06Q 30/0621 33/503

(Continued)

FOREIGN PATENT DOCUMENTS

DE 19821371 A1 11/1999
DE 19917003 A1 10/2000
DE 10222575 A1 11/2003

OTHER PUBLICATIONS

English translation of International Preliminary Report on Patentability of the international searching authority dated Feb. 2, 2017 in international patent application PCT/EP2015/064338 on which the claim of priority is based.

(Continued)

Primary Examiner — Gregory J Toatley, Jr.
Assistant Examiner — Lynda Dinh
(74) Attorney, Agent, or Firm — Walter Ottesen, P.A.

(57) ABSTRACT

A method for creating a measurement protocol in a computer, such as the measurement computer of a coordinate-measuring machine or a computer remote therefrom, includes: providing data necessary for creating a measurement protocol generated on the basis of a measurement sequence by the coordinate-measuring machine; providing specification data specifying predefined conditions under which a measurement sequence should be performed and/or specifying predefined conditions under which examination (Continued)

features should be evaluated; checking the data necessary for creating a measurement protocol as to whether the predefined conditions under which the entire measurement sequence should be performed were met and/or as to whether the predefined conditions under which individual examination features to be examined should be evaluated were met, and; creating a measurement protocol in the form of an electronic document, in which compliance and/or non-compliance with the conditions in accordance with the specification data is documented in the measurement protocol.

16 Claims, 7 Drawing Sheets

(51) Int. Cl.
G05B 19/401 (2006.01)
G05B 23/02 (2006.01)
G01B 5/008 (2006.01)

(52) U.S. Cl.
CPC .............. *G01B 5/008* (2013.01); *G01B 11/03* (2013.01); *G05B 2219/37193* (2013.01); *G05B 2219/37211* (2013.01)

(56) References Cited

U.S. PATENT DOCUMENTS

| | | | |
|---|---|---|---|
| 6,671,571 B1 | 12/2003 | Matsumiya et al. | |
| 6,748,790 B2 * | 6/2004 | Abbe | B25J 9/1692 73/1.79 |
| 6,948,255 B2 | 9/2005 | Russell | |
| 8,212,993 B2 * | 7/2012 | Prams | G01B 21/042 356/3.01 |
| 8,615,893 B2 | 12/2013 | Atwell et al. | |
| 2005/0171728 A1 * | 8/2005 | Rogele | G05B 19/401 702/152 |
| 2009/0049704 A1 * | 2/2009 | Styles | G01B 5/012 33/503 |
| 2013/0139397 A1 * | 6/2013 | Jordil | G05B 19/402 33/503 |
| 2014/0222373 A1 * | 8/2014 | Sprenger | G01B 5/008 702/155 |
| 2015/0285616 A1 * | 10/2015 | Jordil | G06K 9/52 348/135 |
| 2016/0018207 A1 * | 1/2016 | Fuchs | G01B 5/004 702/95 |

OTHER PUBLICATIONS

English translation and Office action of the German Patent Office dated Mar. 10, 2015 in the corresponding German patent application 10 2014 214 771.9.

English translation of International Search Report of the international searching authority dated Aug. 13, 2015 in international patent application PCT/EP2015/064338 on which the claim of priority is based.

"Koordinatenmesstechnik", 1992, Die Bibliothek der Technik , Carl Zeiss, pp. 56 to 59, Verlag moderne industrie AG & Co, Landsberg/Lech, Germany.

Weckenmann, A., Automated English translation of Chapter 7 of "Koordinatenmesstechnik, Flexible Strategien für funktions- and fertigungsgerechtes Prüfen, From the measurement sequence plan over programming, execution and evaluation to the presentation of the results", second edition (completely revised), pp. 287 to 322, published in 2012 by Carl Hanser Verlag Munich Vienna, ISBN 978-3-446-40739-8.

* cited by examiner

METHOD FOR CREATING A MEASUREMENT PROTOCOL AND COMPUTER FOR PERFORMING THE SAME

CROSS REFERENCE TO RELATED APPLICATIONS

This application is a continuation application of international patent application PCT/EP2015/064338, filed Jun. 25, 2015, designating the United States and claiming priority from German application 10 2014 214 771.9, filed Jul. 28, 2014, and the entire content of both applications is incorporated herein by reference.

FIELD OF THE INVENTION

The present invention relates to a method for creating a measurement protocol in a computer, such as the measurement computer of a coordinate-measuring machine or a computer that is remote from the coordinate-measuring machine. The application further relates to a computer which is configured to perform the method according to the invention.

BACKGROUND OF THE INVENTION

Creating measurement protocols in the measurement computer of a coordinate-measuring machine has long been known from the prior art. The production of a measurement protocol is usually the last step when measuring a workpiece. When measuring a workpiece, the typical process in the prior art is as follows. First, an examination plan is produced, in which the examination features to be examined of a workpiece to be measured are contained. Such examination features can be, for example, the spacing of the center points of two holes, the deviations of measurement points on a free-form surface with respect to a predetermined form, the location of the center points of a hole, the diameter of a hole in accordance with an envelope circle, et cetera. Based on the examination plan, a measurement sequence is defined in order to specify the measurement points on the surface of the workpiece to be measured which are necessary for the evaluation of the examination features. In a next step, the thus specified measurement sequence is worked through by the coordinate-measuring machine, as a result of which the required measurement points on the surface of the workpiece are recorded according to the measurement sequence that is specified by the examination plan. Thereafter, the individual examination features of the examination plan are evaluated based on the recorded measurement points, and as a consequence, the data necessary for creating a measurement protocol are obtained. A measurement protocol is generated from this data in the form of an electronic document, in which the measurement results are maintained.

Document DE 198 21 371 A1, for example, describes a method for measuring a workpiece with an automated measurement sequence and a coordinate-measuring machine which is correspondingly configured for performing the method. The method comprises three fundamental method steps. In a first method step, the automated measurement sequence is specified, wherein the latter is specified on the basis of examination features which are to be evaluated during a measurement sequence. In the process, geometrical elements on the workpiece surface are selected using CID data, which are necessary for examining the desired examination features. In addition, the movement paths for the sensor for scanning the respective geometrical elements are specified. In a second method step, a workpiece is then scanned according to the measurement sequence. In a third method step, the examination features to be examined are then evaluated on the basis of the measurement data recorded in the measurement sequence and output to the user of the coordinate-measuring machine in a form which is not described further here. Such output typically takes place in the form of a measurement protocol, which is generated as an electronic document, for example a PDF document.

When creating such an examination plan and measurement sequence, the use of the coordinate-measuring machine has great latitude. This is highly advantageous in principle, since it allows great flexibility in terms of the reactions to a multiplicity of unpredictable situations. However, a disadvantage is that the user of the coordinate-measuring machine is responsible for ensuring that the measurement results presented in the measurement protocol are in fact sensible. However, it is extremely important, especially in the case of components which must be measured with a high degree of precision or in the case of components which must meet high safety requirements, such as for example turbine blades in aircraft engines, or in the case of components which are used in the medical field, such as artificial hip joints, that the measurement protocols which are assigned to a component to be measured reliably present trustworthy and documented measurement results.

SUMMARY OF THE INVENTION

It is an object of the invention to provide a method for creating a measurement protocol with which the reliability of the measurement results can be improved, and to provide a corresponding computer with which such a method can be performed.

The object can, for example, be achieved by a method for creating a measurement protocol in a computer, such as the measurement computer of a coordinate-measuring machine or a computer which is remote from the coordinate-measuring machine, is proposed, the method including the following steps:

providing the data necessary for creating a measurement protocol that were generated on the basis of a measurement sequence by the coordinate-measuring machine providing specification data which specify predefined conditions under which a measurement sequence should be performed and/or which specify the predefined conditions under which examination features should be evaluated checking the data necessary for creating a measurement protocol as to whether the predefined conditions under which the entire measurement sequence should be performed were met and/or as to whether the predefined conditions under which individual examination features to be examined should be evaluated were met, and creating a measurement protocol in the form of an electronic document, in which the compliance and/or the non-compliance with the individual conditions in accordance with the specification data is documented in the measurement protocol.

In addition, the object can, for example, also be achieved via a computer which is configured to perform the described method.

The methods according to the invention result in a series of special advantages. By providing specification data which specify the predefined conditions under which a measurement sequence should be performed and because of the subsequent checking of the data necessary for creating a measurement protocol as to whether the predefined conditions under which the entire measurement sequence should be performed were met and the subsequent documenting of the compliance and/or the non-compliance with these individual conditions in the measurement protocol, it can be ensured that the coordinate-measuring machine indeed provides measurement values which fall within the given accuracy specification of the coordinate-measuring machine and the stipulations. This will be explained on the basis of an illustrative example. For example, if a workpiece which was just freshly processed and has, due to the processing, a temperature of 80° C. is measured in a coordinate-measuring machine, and the temperature of the workpiece was not previously measured or, if appropriate, taken into consideration by way of corresponding measures, such as for example by way of computational compensation of the thermal linear expansion of the workpiece, this inevitably results in the measurement values not corresponding to the measurement values the workpiece will exhibit in the cooled state. If, on the other hand, a prerequisite under which a measurement sequence should be performed is specified to the effect that, before measuring the workpiece, the workpiece temperature must be captured and the workpiece temperature must not be higher than 22° C., this would now be determined according to a method according to the invention and noted in the protocol.

By providing specification data which specify predefined conditions under which examination features should be evaluated and because of the checking of the data necessary for creating a measurement protocol as to whether the predefined conditions under which individual examination features to be examined should be evaluated are met, and the subsequent documenting of the compliance and/or non-compliance with these conditions in the measurement protocol, it can furthermore be ensured that the examination features to be examined were not measured in an improper manner.

This will also be explained by way of an illustrative example. For example, if a hole whose diameter for production technological reasons must not be smaller than a specific diameter, is measured by way of a total of only 10 measurement points, this could result in the hole falling short of the minimum permissible diameter at places which were not captured by way of the 10 measurement points. On the other hand, by providing specification data which specify predefined conditions under which examination features should be evaluated, a minimum measurement point density could be indicated for the examination feature "determination of the minimum diameter of a hole," wherein, upon examining the data required for creating a measurement protocol as to whether the predefined conditions under which individual examination features to be examined should be evaluated were met, a determination would be made that the minimum possible measurement point density was clearly not achieved. This shortfall would then be documented correspondingly in the measurement protocol.

There are, of course, a multiplicity of other individual specification data which likewise prevent improper determination of an examination feature. For example, improper elimination of outlier measurement values can result in unusable measurement results. For example, if due to the outlier elimination important measurement points are removed from the measurement result of a geometrical element measured for evaluating an examination feature, this can result in a falsified form of the respectively measured geometrical element and thus in an erroneous result of the examination feature. The same is also true for an unusable filter setting for filtering the measurement points. For example, if the filtering leads to the filtering out of important components of the form of a measured geometrical element, this likewise results in an erroneous result of the relevant examination feature. If a compensation element is fitted into a measured geometrical element during the examination (for example, an envelope circle, a maximum inscribed circle, or a Gauss circle can be fitted into the geometrical element "circle"), it is of course also important that the suitable compensation element is fitted into the geometrical element since otherwise once again an erroneous evaluation of the examination feature could result.

A further advantage in the process described is found in that the exact conditions under which the data of the measurement protocol was recorded are still known a long time after the measurement. This can become interesting, for example, if a component to be measured later causes damage which could possibly be due to an erroneous measurement of the workpiece.

Another advantage can be found in that, due to a corresponding provision of specification data which specify predefined conditions under which a measurement sequence should be performed, and/or because of the provision of specification data what specifies predefined conditions under which examination features should be evaluated, specific examination features are always measured in the same way or measurement sequences are always performed in the same way. This could under certain circumstances help to more quickly uncover and eliminate mistakes in the production sequence.

A further advantage can here be found in that users of the coordinate-measuring machine can actively be made aware of when important steps in the measurement sequence are not being performed according to the stipulations.

A further advantage can here be found in that with the measurement protocols, meaningful documents are created which demonstrate the reliability of the measurement results for State authorities or for buyers of the workpieces.

The predefined conditions under which a measurement sequence should be performed can be conditions which specify a sequence of process steps which must be followed when measuring a workpiece. It can hereby be ensured that a series of process steps which are necessary for attaining reliable measurement results are in fact performed by the use of the coordinate-measuring machine. The list of such process steps is relatively large.

Such a process step which could be specified as compulsory for example when performing a measurement could be the performance of a calibration operation for ascertaining the sensor coordinates. Hereby, what is documented in the corresponding measurement protocol is that a calibration operation for ascertaining the sensor coordinates has indeed taken place. In the same way, a calibration operation could be performed for ascertaining the location of the workpiece. Hereby, what is documented once again in the measurement protocol is that a calibration operation for the location of the workpiece has indeed been performed. A further process step could be a check as to whether a given time period after which the accuracy of the coordinate-measuring machine must once more be examined has already elapsed, wherein, if appropriate, the accuracy must be checked again on the basis of a calibration workpiece. It is hereby possible to ensure with a somewhat high probability that the measurement values of the coordinate-measuring machine are still within the specification. An important process step could be the recording of temperature values on the coordinate-measuring machine and/or on the workpiece and subsequent checking whether a valid measurement of the workpiece can be carried out under the given temperature measurement values. What can be ensured hereby is that thermal linear expansions of the workpiece and/or of the coordinate-measuring machine are properly taken into consideration in the ascertainment of the measurement values.

However, the predefined conditions under which a measurement sequence should be performed could also be parameter values which specify specific parameters for ascertained values which must be complied with when measuring a workpiece. One example of such parameters could be temperature measurement values of temperature sensors. For example, what could be specified here is that, starting from certain measurement values of the temperature sensors, a measurement must not be performed at all, or that, starting from certain measurement values of the temperature sensors, an electronic temperature compensation must be switched on. Further values could be values, for example, which describe the thermal linear expansion of components of the coordinate-measuring machine or of the workpiece. Furthermore, the parameters could also include values which are associated with the check of the measurement accuracy of the coordinate-measuring machine. They can likewise be values which are associated with the calibration of the workpiece to be measured.

The check whether the predefined conditions under which a measurement sequence should be performed were met can be done relatively simply by checking whether all specified stipulations were implemented.

With respect to the predefined conditions under which individual examination features of the examination plan are evaluated, a measurement strategy which is specified for the respective examination feature should be provided, wherein this measurement strategy can include, among others, the following elements:
a) references to probing strategies, in particular probing strategies for capturing geometrical elements, and/or
b) references to evaluation strategies, in particular evaluation strategies for fitting in compensation elements and/or for filtering the measurement points and/or for outlier elimination of outlier measurement points, and/or
c) examination conditions, wherein, in dependence on the result of the examination condition, reference to a further measurement strategy is made and/or a reference to a further evaluation strategy is made, and/or
d) references to further measurement strategies of examination features, and/or
e) describing information which is associated with the measurement strategy for an examination feature and/or a single geometrical element.

Unlike in the case of checking the predefined conditions under which a measurement sequence should be performed, the concept for checking whether the predefined conditions under which individual examination features of the examination plan should be evaluated were met is somewhat more complex. In contrast, when checking whether the predefined conditions under which individual examination features of the examination plan should be evaluated were met, each individual examination feature which is in the examination plan is checked for whether it contains a reference to a measurement strategy for the examination feature which is contained in the specification data. If it contains such a reference, another check must be carried out as to whether this measurement strategy was indeed followed. The predefined conditions for this examination feature were met only if an examination feature contains a reference to a measurement strategy for the examination feature that is contained in the specification data, and additionally this measurement strategy was indeed followed.

In order to ensure protection against changes in the measurement protocols, the measurement protocol which is produced in the form of an electronic document can be provided with a signature. Purely in principle, different signatures can be used here. In the simplest case, the data can be included in the document together with the creator of the measurement protocol similar to an email signature. However, the electronic document should preferably be signed so as to be protected against falsification by way of the signature. For the signature, an electronic signature should be used, in which the signature data is linked to the electronic document, wherein the signature creator can be identified on the basis of the signature data and the integrity of the signed electronic document can be examined. In technological terms, this electronic signature thus fulfills the same purpose as a handwritten signature on paper documents. If the measurement protocol is produced, for example, in the form of a PDF document, the signature function that is designated for PDF documents can be used.

For performing the measurement steps mentioned in connection with the creation of the measurement protocol, in particular a computer is suitable, wherein the computer is configured to perform this method. The computer can be a typical personal computer. Of course, various other computers are possible, such as for example notebooks, tablet PCs, smartphones et cetera.

The data that is necessary for creating a measurement protocol and is provided in the measurement computer of the coordinate-measuring machine or in the computer which is remote from the coordinate-measuring machine, are preferably generated according to the following method steps in a coordinate-measuring machine:
recording measurement points on the surface of workpiece with the coordinate-measuring machine according to a measurement sequence which is specified by way of an examination plan
evaluating the examination plan using the recorded measurement points and generating the data necessary for creating a measurement protocol.

Particularly suitable for performing this described method is a coordinate-measuring machine for measuring workpieces, including among others a computer which is used as the measurement computer of the coordinate-measuring machine and is configured to perform the method steps which are connected to the creation of the measurement protocol, wherein the coordinate-measuring machine is additionally configured to perform the method described in the previous paragraph.

If the measurement protocol is produced in a computer that is remote from the coordinate-measuring machine, then for providing the data that is necessary for creating a measurement protocol in this computer, the data should be transmitted from the coordinate-measuring machine to the computer preferably via a data connection. The measurement protocol produced by the computer should then in turn be transmitted back to the coordinate-measuring machine via preferably the same or another data connection. There are of course a multiplicity of various possibilities for the data connection, such as for example a data connection via a telephone line using a modem, an Internet connection, a radio connection, a mobile radio connection et cetera.

Particularly suitable for performing this method which was just described is in particular a system including a coordinate-measuring machine for measuring workpieces, which is configured to perform the method steps for recording the measurement points and for evaluating the examination plan, and a computer which is separate from the coordinate-measuring machine and is configured to perform the method steps which are in connection with the creation of the measurement protocol, wherein furthermore the coordinate-measuring machine in the computer is intended to be configured to perform the method steps which were mentioned in the previous paragraph.

The coordinate-measuring machine can in principle be any desired coordinate-measuring machine that is commercially available today. Nowadays, there is a large spread of variation of coordinate-measuring machines which differ from one another, among others, by way of the sensors for scanning the workpiece (for example tactile sensors, optical sensors, sensors for x-rays et cetera.), and by way of the mechanism for moving the sensor and/or the workpiece (portal mechanism, cantilever mechanism, stand mechanism, bridge mechanism, rotary table, displaceable workpiece table, robot arm having hinge joints et cetera.). The book "Koordinatenmesstechnik, Flexible Strategien für funktions- and fertigungsgerechtes Prüfen" by Albert Weckenmann, second edition (completely revised), published in 2012 by Carl Hanser Verlag Munich Vienna, ISBN 978-3-446-40739-8 describes, among others, the construction and functionality of coordinate-measuring machines which are typical nowadays.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
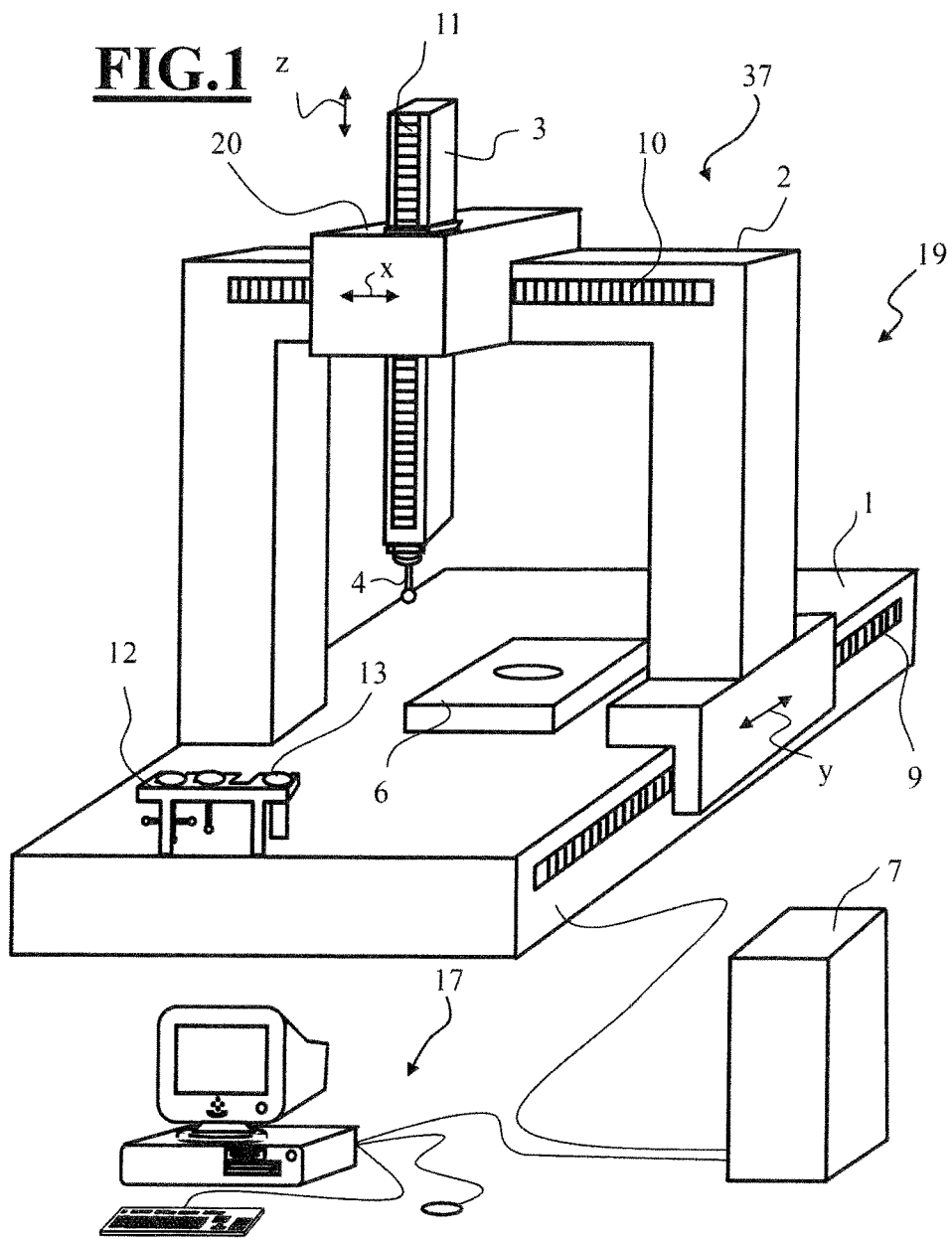
FIG. 1 shows a coordinate-measuring machine 19, in which the method according to the invention for creating a measurement protocol is performed.

FIG. 1 shows a coordinate-measuring machine 19 having a measurement computer 17 on which a method according to the invention for creating a measurement protocol 18 can be performed. The coordinate-measuring machine 19, which is illustrated here purely by example, in the present case has what is known as a portal construction, wherein a first measurement carriage 2 in the form of a portal is guided movably along two parallel guides in the region of the measurement table 1. A scale system 9 having a corresponding read sensor, which is not illustrated here in more detail, is provided for measuring the position of the portal. Additionally, a drive is provided which can displace the first measurement carriage 2 along the guide in the direction marked with the arrow y. A second measurement carriage 20 (often designated the x carriage) is guided movably along the crossbeam of the portal-type first measurement carriage 2 that bridges the measurement table, wherein the second measurement carriage has a scale system 10 with associated read sensor for position measurement in the direction which is marked with the arrow x, wherein the second measurement carriage 20 can be moved in the direction which is marked with the arrow x via a second drive. Movably guided on the second measurement carriage 20 in turn is a third measurement carriage 3 (often referred to as a quill), wherein the position of the measurement carriage 3 in the direction which is marked with the arrow z can be ascertained via a scale system 11 with an associated read sensor, and a drive is again provided in order to move the third measurement carriage 3 in the third coordinate direction z. Attached to the lower end of the third measurement carriage 3 is a sensor 4, which in the present case is configured in the form of a tactile sensor. Arranged on the measurement table 1 is here a workpiece 6, which is probed by the tactile sensor 4 by moving the three measurement carriages 2, 20, 3, wherein measurement values on the surface of the workpiece 6 to be measured are ascertained from the signals of the sensor 4 and from the scale system positions of the scale systems 9, 10, 11. The controller for controlling the drives of the measurement characters 2, 20, 3 is situated in the control system 7. In addition, the scale system values of the scale systems 9, 10, 11 are also read by the control system 7, as are the signals of the sensor 4. Furthermore connected to the control system 7 is a measurement computer 17. The measurement computer 17 is here used to create an examination plan, to then create a measurement sequence based on the examination plan, and to pass on the information necessary for performing the measurement sequence to the control system 7. The control system 7 then carries out the measurement sequence. Such information which is passed from the measurement computer 7 to the control system can be of any desired type. For example, the information could be information which relates to the probing of the workpiece at the desired locations. At the same time, it may be information which stipulates that temperature measurement values on the components of the coordinate-measuring machine 19 and/or on the workpiece 6 are to be ascertained by temperature sensors. The control system 7 in turn then feeds the ascertained measurement values of the workpiece 6 and also other parameters, such as for example the measured temperature values of the workpiece 6 or of the components of the coordinate-measuring machine back to the measurement computer 17, where the supplied values are then evaluated by the measurement computer 17. On the basis of the evaluated values, a measurement protocol is created, as will be explained in detail below.

Figure 2:
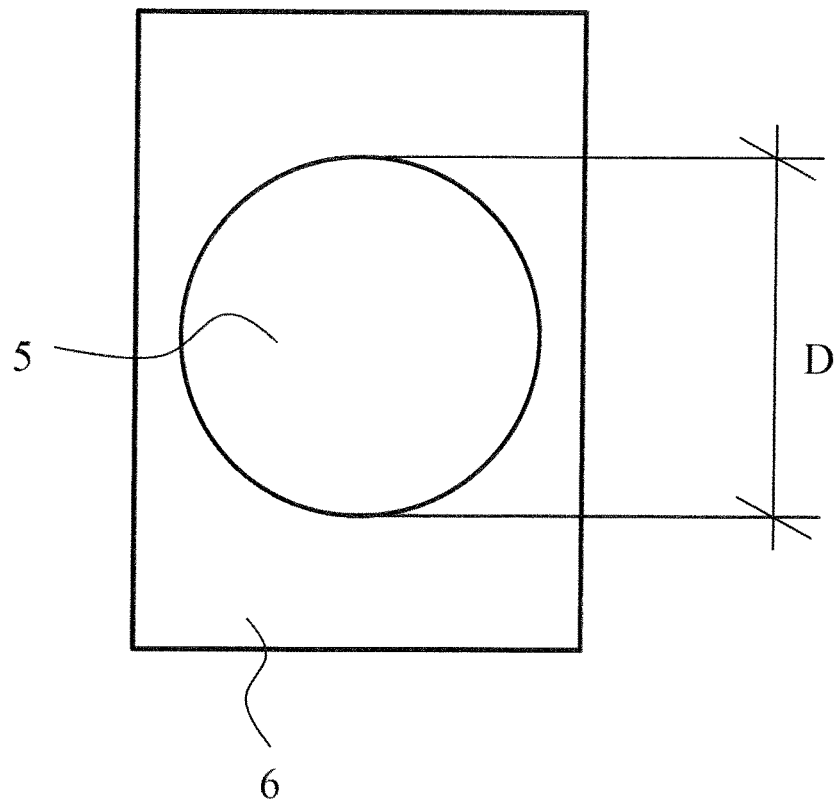
FIG. 2 shows the workpiece 6 of FIG. 1, on which the examination feature "diameter measurement" for the diameter D of the hole 5 is to be evaluated.

A very simple, purely exemplary measurement of the workpiece 6 shown in FIG. 1, in which a method according to the invention for creating a measurement protocol is used, could consist in simply determining only the diameter D of the hole 5 located therein, as is illustrated by FIG. 2. The only examination feature to be evaluated would here then be the "diameter" of the hole 5.

Figure 3:
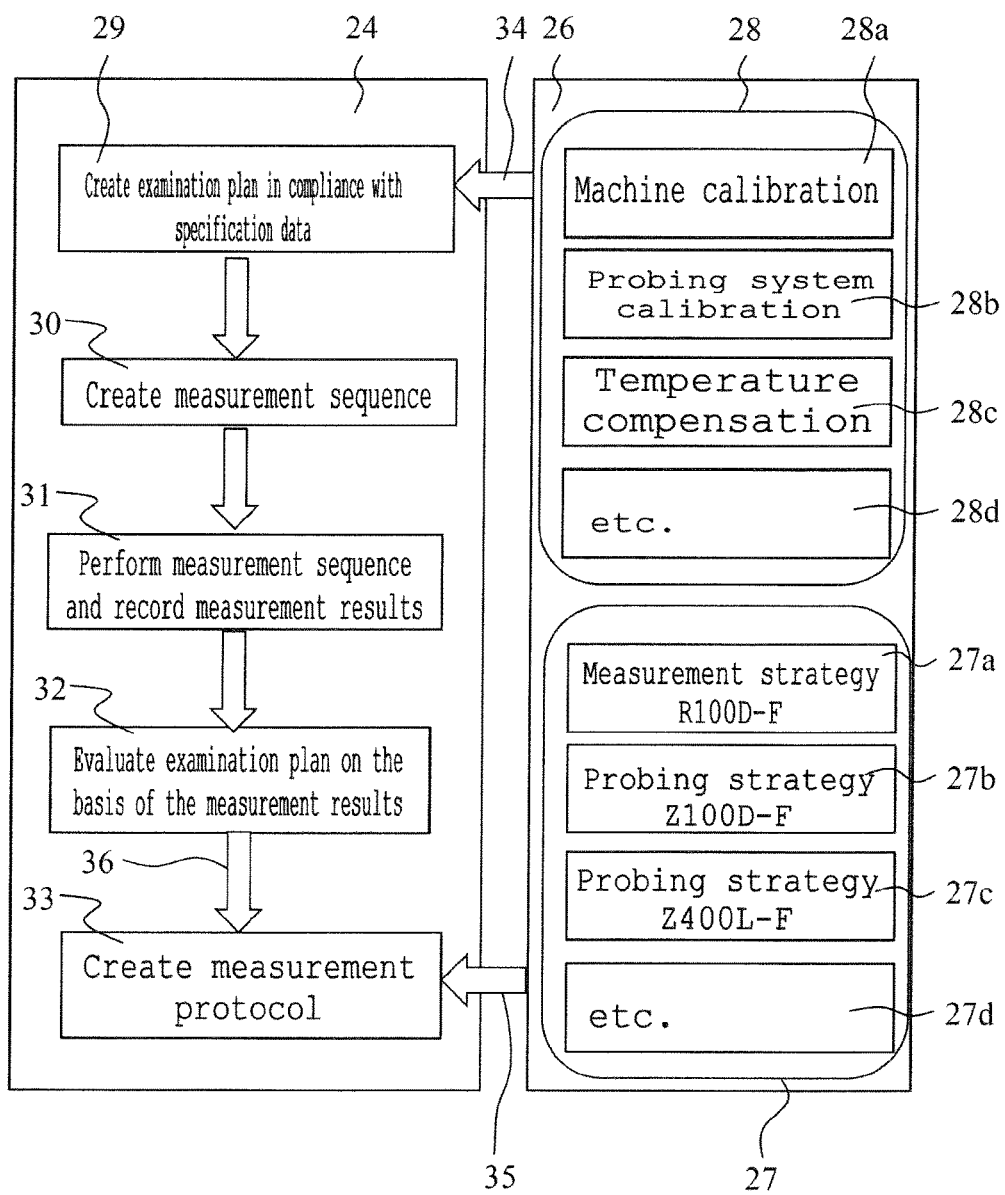
FIG. 3 shows a pure schematic of the measurement program 24 which is present on the measurement computer 17 of FIG. 1, together with its program functions 29 to 33 contained therein and the specification data 26.

The specifics of this procedure will be explained below with reference to FIGS. 3 and 4. FIG. 3 shows here, in a highly abstract manner, the data and programs on the measurement computer 17, with which a user can effect the measurement of the workpiece 6 of FIG. 1. The reference sign 24 here designates a measurement program running in the measurement computer 17, wherein the reference signs 29 to 33 show in an abstract manner the individual steps which are to be carried out with reference to the measurement program 24, from creating the examination plan to creating the measurement protocol. It is to be appreciated that the measurement program 24 and the functionalities 29 to 33 which are contained therein are illustrated in an extremely abstracted manner and that this measurement program can of course be configured very differently. For example, it can be a single program which runs completely on the measurement computer 17. However, individual ones or all of the functionalities 29 to 33 can just as well be implemented in separate programs. If at least individual ones of the functionalities 29 to 33 are implemented in separate programs, the latter can even be performed on different computers. In a second embodiment of the invention according to FIG. 7, as will be explained in detail further below, the program functionality 33 "create measurement protocol" is performed on a computer 23 which is separate from the measurement computer 17. The interaction between programs situated on different computers can be effected via technologies which are common nowadays, such as for example the HTTP protocol, via web services, via RPC (remote procedure calls) or CORBA (common object request broker architecture).

The reference sign 26 in turn designates the specification data. The specification data 26 can be provided in a variety of ways, as is sufficiently known from the prior art. For example, the specification data can be stored in the form of a data file, for example in the form of an XML file, in the form of an INI file, or in the form of a different file format. Alternatively, the specification data can also be stored in a database. Of course, the specification data 26 do not have to be located on the measurement computer 17 of FIG. 1. Instead, the specification data 26 can also be accommodated on a remote computer, and access to the data can take place via a data connection. For example, the specification data 26 can also be made available sensually via a database server. This has the particular advantage that a provider of the specification data 26 can maintain the specification data 26 centrally, and the user of the coordinate-measuring machine 19 always has the assurance of accessing current specification data 26. What would be important in any case is that the database or the data file is protected by way of access protection against unauthorized changes.

The reference sign 28 here designates specification data which specify predefined conditions under which a measurement sequence should be performed. In the present case, these are conditions which specify a sequence of process steps which must be followed when measuring a workpiece. Such conditions are designated with the reference signs 28a to 28d in FIG. 3. In this respect, a multiplicity of different examples are given. The reference sign 28a "machine calibration" here designates a stipulation which prescribes a check as to whether a specified time period after which the accuracy of the coordinate-measuring machine must again be checked has already elapsed, and, if appropriate, checking of the accuracy on a calibration workpiece. The reference sign 28b "probe system calibration" here designates a stipulation which prescribes that a calibration operation for ascertaining the sensor coordinates must be carried out in a measurement sequence. The reference sign 28c "temperature compensation" contains stipulations which prescribe the recording of temperature values on the coordinate-measuring machine and/or on the workpiece and stipulate whether a valid measurement of the workpiece can be carried out with the given temperature measurement values. In addition, the stipulations "temperature compensation" 28c also include parameter values (here temperature parameter values), which specify specific parameters (temperature parameters) for ascertained values which must be maintained when measuring a workpiece. In the present case, these are minimum and maximum values for temperature measurement values of temperature sensors which measure the workpiece temperature. The reference sign 28d "et cetera." here designates further specification data which specify predefined conditions under which a measurement sequence should be performed, but which are not listed here in more detail.

The reference sign 27 furthermore designates specification data which specify predefined conditions under which examination features should be evaluated. Reference signs 27a-27d here designate such conditions. This is in particular data which specify a measurement strategy for examination features. The reference sign 27a "measurement strategy R100D-F" here designates purely by example strategy stipulations which relate to the measurement strategy for measuring the diameter of a hole. Such measurement strategy stipulations include a series of stipulations which specify the measurement strategy. One of the stipulations of such a measurement strategy can be a describing item of information which is related to the measurement strategy for the examination feature and for example describes the measurement strategy itself or gives details relating to the measurement strategy. A further stipulation relates to the geometrical elements which must be measured for the respective examination feature. Such stipulations for geometrical elements are here in turn given as a reference to probing strategies for capturing geometrical elements. Typical probing strategy stipulations exist for all common geometrical elements, such as circles, cylinders, planes, free-form surfaces, points, cones, or tori. What is specified as a stipulation for the "measurement strategy R100D-F" according to reference sign 27a for measuring diameters is that a geometrical element circle or cylinder is required which is here specified purely by example by way of a reference to the "probing strategy Z100D-F" according to the reference sign 27b. What is additionally provided as a stipulation is that a geometrical element plane is required which is here specified purely by example by way of a reference to the "probing strategy Z400L-F" according to reference sign 27c. This plane is the plane of the workpiece surface in the region in which the hole in the workpiece is situated. The stipulations relating to the probing strategies which relate to geometrical elements, such as for example the "probing strategy Z100D-F" according to reference sign 27b for circles or cylinders and the "probing strategy Z400L-F" for planes according to the reference sign 27c then in turn contain stipulations relating to how the respective geometrical elements must be measured. The "probing strategy Z100D-F" according to reference sign 27b for circles or cylinders specifies for example under which conditions a circle is to be ascertained (specifically when the hole depth is less than the hole diameter), and under what conditions a cylinder as an alternative to the circle should be ascertained (a cylinder is to be ascertained from three measured circles only if the hole depth corresponds to 1 to 3 times the hole diameter; however, a cylinder is to be ascertained from five measured circles if the hole depth is more than 3 times the hole diameter). It also specifies in dependence on the hole diameter which measurement speed should be used, how many measurement values per measured circle should be used, and what size probe ball should be selected. What is additionally specified in dependence on the respective hole diameter is under what conditions outliers are eliminated from the measurement values and which filter settings must be used for filtering the measurement results.

To give an impression of how the specification data 26 are stored, purely by example and in extracts the content of an XML file is shown below, in which parameters for the specification data 28c "temperature compensation" and 27a "measurement strategy R100D-F" are shown by way of example.

```
<?xml version="1.0" encoding="UTF-8" standalone="yes"?>
<SpecificationData>
    <MeasurementSequenceConditions>
    ...
    <TemperatureCompensation>
        <MeasureWorkpieceTemp>ON</MeasureWorkpieceTemp>
        <MinimumWorkpieceTemp> 19</ MinimumWorkpieceTemp>
        <MaximumWorkpieceTemp> 23</MaximumWorkpieceTemp>
        <LinearCompensation>ON</LinearCompensation>
        ....
    </TemperatureCompensation>
    ...
    </ MeasurementSequenceConditions >
    <ConditionsExaminationFeatures>
        <MeasurementStrategyR100D-F>
            <Description>R100D-F ascertains diameter..</Description>
            <GeometricalElement>Z100D-F</GeometricalElement>
            <GeometricalElement>Z400L-F</GeometricalElement>
            <Fitting Switch="ON" Eval="Depth < Dia">MICI</Fitting>
            <Fitting Switch="ON" Eval="Depth > Dia">MICY</Fitting>
            <Fitting Switch="OFF" Eval="Depth < Dia">LSCI</Fitting>
            <Fitting Switch="OFF" Eval="Depth > Dia">LSCY</Fitting>
        </MeasurementStrategyR100D-F>
        ....
    </ConditionsExaminationFeatures>
</SpecificationData>
```

The specification data 28 of FIG. 3 which specify predefined conditions under which a measurement sequence should be performed are between the tags <MeasurementSequenceConditions> and </MeasurementSequenceConditions>. These are the specification data which are designated in FIG. 3 with the reference signs 28a to 28d. The entries between the tags <TemperatureCompensation> and </TemperatureCompensation> here give the stipulation with respect to the temperature compensation according to reference sign 28c. The entry between the tags <Measure WorkpieceTemp> and </Measure WorkpieceTemp> here specifies the stipulation that the workpiece temperature must be measured for producing a valid measurement protocol. The value 19 between the tags <MinimumWorkpieceTemp> and </MinimumWorkpieceTemp> specifies that the minimum workpiece temperature can be 19° C. The value 23 between the tags <MaximumWorkpieceTemp> and </MaximumWorkpieceTemp> specifies that the maximum workpiece temperature can be 23° C. The value ON between the tags <LinearCompensation> and </LinearCompensation> specifies that the thermal linear expansion of the workpiece 6 due to the respectively measured workpiece temperature should be computationally compensated for.

In contrast, located between the tags <ConditionsExaminationFeatures> and </ConditionsExaminationFeatures> is the specification data 27 from FIG. 3, which specify predefined conditions under which examination features should be evaluated. These are the specification data which are designated in FIG. 3 with the reference signs 27a to 27d. The entries between the tags <MeasurementStrategyR100D-F> and </MeasurementStrategyR100D-F> here specify the stipulations with respect to the "measurement strategy R100D-F" according to reference sign 27a, which is used for measuring diameters in holes. The entry between the tags <Description> and </Description> here contains a description of the measurement strategy R100D-F. The entry Z100D-F between the tags <GeometricalElement> and </GeometricalElement> furthermore signifies a reference to the "probing strategy Z100D-F" according to reference sign 27b, under which the stipulations relating to the probing strategy for capturing the geometrical element "circle or cylinder" are located. The next entry Z400L-F between the tags <GeometricalElement> and </GeometricalElement> signifies a reference to the "probing strategy Z400L-F" according to reference sign 27c, under which the stipulations relating to the probing strategy for capturing the geometrical element "plane" are located. The entry MICI between the tags <Fitting Switch="ON" Eval="Depth<Dia"> and </Fitting> signifies the following. The stipulations Switch="ON" and Eval="Depth<Dia" give stipulations for the case that a fitting is switched on during the measurement (Switch="ON") and that the hole depth is less than the hole diameter (Eval="Depth<Dia"). In this case, the method MICI (minimum inscribed circle) should be performed, that is, a minimum inscribed circle should be inscribed into the measured points. The entry MICY between the tags <Fitting Switch="ON" Eval="Depth>Dia"> and </Fitting> signifies the following. The stipulations Switch="ON" and Eval="Depth>Dia" give stipulations for the case that a fitting is switched on during the measurement (Switch="ON") and that the hole depth is greater than the hole diameter (Eval="Depth>Dia"). In this case, the method MICY (minimum inscribed cylinder) should be performed, that is, a minimum inscribed cylinder should be inscribed into the measured points. (Note: As has already been described above relating to the probing strategy Z100D-F according to reference sign 27b, a cylinder rather than a circle is determined in case the hole depth is greater than the hole diameter.) The entry LSCI between the tags <Fitting Switch="OFF" Eval="Depth<Dia"> and </Fitting> signifies the following. The stipulations Switch="OFF" and Eval="Depth<Dia" give stipulations for the case that a fitting is switched off during the measurement (Switch="OFF") and that the hole depth is less than the hole diameter (Eval="Depth<Dia"). In that case, the method LSCI (least squares circle) should be performed, that is, a circle should be fitted into the measured points via the Gaussian method of the least squares. The entry LSCY between the tags <Fitting Switch="OFF" Eval="Depth>Dia"> and </Fitting> signifies the following. The stipulations Switch="OFF" and Eval="Depth>Dia" give stipulations for the case that a fitting is switched off during the measurement (Switch="OFF") and that the hole depth is greater than the hole diameter (Eval="Depth>Dia"). In that case, the method LSCY (least squares cylinder) should be performed, that is, a cylinder should be fitted into the measured points via the Gaussian method of the least squares.

As already explained above, the entries between <ConditionsExaminationFeatures> and </ConditionsExaminationFeatures> specify the predefined conditions under which individual examination features of the examination plan are evaluated. The data between the tags <MeasurementStrategyR100D-F> and </MeasurementStrategyR100D-F> here specify a measurement strategy for the examination feature "Measure diameter," wherein this measurement strategy includes a plurality of different elements. This includes references to probing strategies, in particular probing strategies for capturing geometrical elements (see for example the entry <GeometricalElement>Z100D-F</GeometricalElement>). Moreover, the measurement strategy also includes references to evaluation strategies, for example the evaluation strategy MICI (see entry <Fitting Switch="ON" Eval="Depth<Dia">MICI</Fitting>), that here provides for the evaluation strategy for fitting a compensation element "minimum inscribed circle." The same instruction <Fitting Switch="ON" Eval="Depth<Dia">MICI</Fitting> furthermore has two examination conditions, wherein a reference to the further evaluation strategy MICI is given in dependence on the result of these examination conditions. First, the examination condition Switch="ON", on the basis of which a check is carried out as to whether a fitting is switched on, is included. Also switched on is the examination condition Eval="Depth<Dia", that checks whether the hole depth is less than the diameter. Only if both examination conditions are met is the reference to the evaluation strategy MICI activated. In addition, the entry <Description>R100D-F ascertains diameter . . . </Description> contains describing information which is connected to the measurement strategy for the examination feature.

Now that the specification data 26 have been explained in detail, the individual functionalities 29 to 33 of FIG. 3, which are provided by the measurement program 24, the function having the reference sign 29 "create examination plan in compliance with specification data" starts by creating an examination plan. As already explained in the introductory part of the description, here substantially the individual examination features are specified, which are to be checked on the workpiece to be measured. As an example of how the creation of an examination plan can be effected, reference is made purely by example to the specification DE 198 21 371 A1, which was already mentioned in the introductory part of the description and which explains the former by way of example. The measurement program should here be configured such that the user can create the examination plan in compliance with the specification data 26 without great effort. The necessity for the examination plan to be createable in compliance with the specification data 26 is clear especially because, in connection with the creation of the measurement protocol 18, the intention after all is to check whether the predefined conditions under which the entire measurement sequence should be performed were met and/or whether the predefined conditions under which individual examination features to be examined should be evaluated were met.

In order to be able to create an examination plan in compliance with the specification data 26 using the measurement program 24, the measurement program 24 should have access to the specification data 26, which is indicated by the arrow 34. Based on this data, there is a multiplicity of possibilities for creating a corresponding examination plan in the measurement program 24 which is in compliance with the specification data 26. The incorporation of the specification data 28a to 28d of FIG. 4 in the examination plan is relatively simple. The specification data 28a to 28d after all specify, as already explained above, conditions under which a measurement sequence should be performed. In this respect, the measurement program only needs to read the corresponding specification data 28a-28d and the corresponding parameters into the examination plan for the individual stipulations to be worked through correspondingly when the examination plan is implemented.

A little more complex is linking the examination plan with the specification data 27a to 27d, which, as mentioned, specify predefined conditions under which examination features should be evaluated. One possibility in this respect would be an assistant (wizard) which guides the user of the measurement program 24 through the process of creating the examination plan. Another possibility would be for the measurement program 24 to allow only inputs that lead to an examination plan which is in compliance with the specification data. A further possibility which gives the user the freedom when creating the examination plan to create the examination plan only in partial compliance with the specification data can be implemented by providing additional control elements for the respectively available examination features, such as list boxes, via which for the respective examination feature an examination strategy in accordance with specification data can be selected for the respective examination feature.

Figure 4:
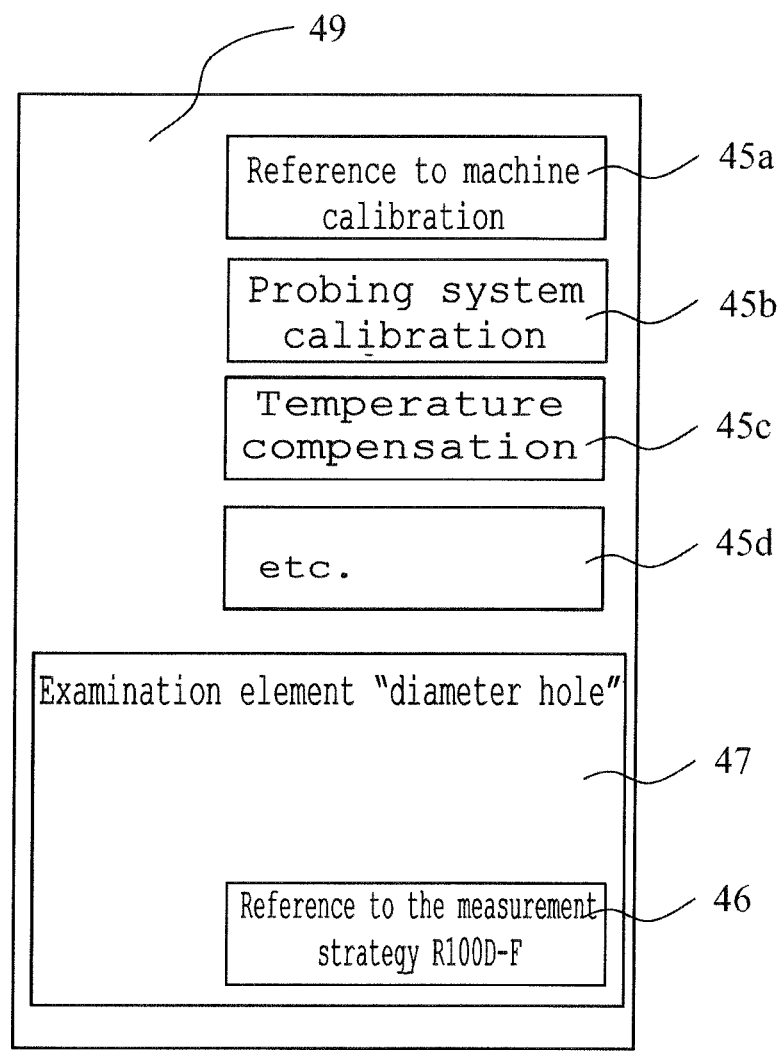
FIG. 4 shows a pure schematic of an examination plan 49.

A highly abstract and purely schematic overview of such an examination plan can be seen in FIG. 4. What is shown here in a very abstract manner are the data structures which are relevant for the present invention and which are contained in such an examination plan 49 for the above-described, purely exemplary examination task (ascertaining the diameter D of the hole 5 from the workpiece 6 shown in FIG. 2). The reference signs 45a to 45d designate the data in the examination plan 49 which ensure that the coordinate-measuring machine, during the implementation of the examination plan 49, in fact implements the specification data 28a to 28d. This ensures that when the examination plan 49 is implemented, the conditions under which a measurement sequence should be performed and which are specified by the specification data 28a to 28d (cf. FIG. 3) are indeed implemented. In addition, it is possible hereby to check at the time of the creation of the measurement protocol that these conditions which are specified by the specification data 28a to 28d were in fact met.

The reference sign 47 contains all the information which is necessary for measuring and evaluating the single examination feature to be examined, specifically the determination of the diameter D of the hole 5. One of these items of information is a "reference to the measurement strategy R100D-F" which is to be provided with the reference sign 46. Using this reference 46, it is then possible to create at the time that the measurement protocol is created, the connection to the "measurement strategy R100D-F" according to reference sign 27a in the specification data 27 (cf. FIG. 3)

and to then check on the basis of this "measurement strategy R100D-F" according to the reference sign 27a (cf. FIG. 3) whether the specification data 27a for the "measurement strategy R100D-F" were in fact complied with. Using such references (as here for example the reference 46) it is possible to assign to the various examination features of an examination plan specification data 27 in which corresponding measurement strategies for the respective examination feature are located. It is possible hereby thus to check when creating the measurement protocol whether the predefined conditions under which examination features should be evaluated were met.

A second functionality with the reference sign 30 "create measurement sequence" (see FIG. 3 again) then creates a measurement sequence from the examination plan 49. The measurement plan is here created from the examination plan 49 at least largely automatically, since the examination plan contains all the information that is necessary for creating the measurement sequence.

A further functionality having the reference sign 31 "perform measurement sequence and record measurement results" then executes the measurement sequence and in the process records the attained measurement results. As already explained further above, the measurement computer 17 to this end passes all necessary control data to the control system 7 and receives the measurement values which were recorded during the then performed measurement sequence back from the control system 7. Measurement points on the surface of the workpiece 6 are thus then recorded hereby using the coordinate-measuring machine 19 according to a measurement sequence which is specified by the examination plan 49.

A subsequent functionality 32 "evaluate examination plan on the basis of the measurement results" evaluates the examination plan 49 using the recorded measurement points and produces the data necessary for creating a measurement protocol.

The last functionality 33 "create measurement protocol" thereupon creates the measurement protocol. As is indicated by the arrow 36, the data which are necessary for creating a measurement protocol and which were generated on the basis of a measurement sequence by the coordinate-measuring machine 19 on account of the preceding functionality 32 "evaluate examination plan on the basis of the measurement results," are provided. As is additionally indicated by the arrow 35, the specification data 26 are also provided.

Figure 5:
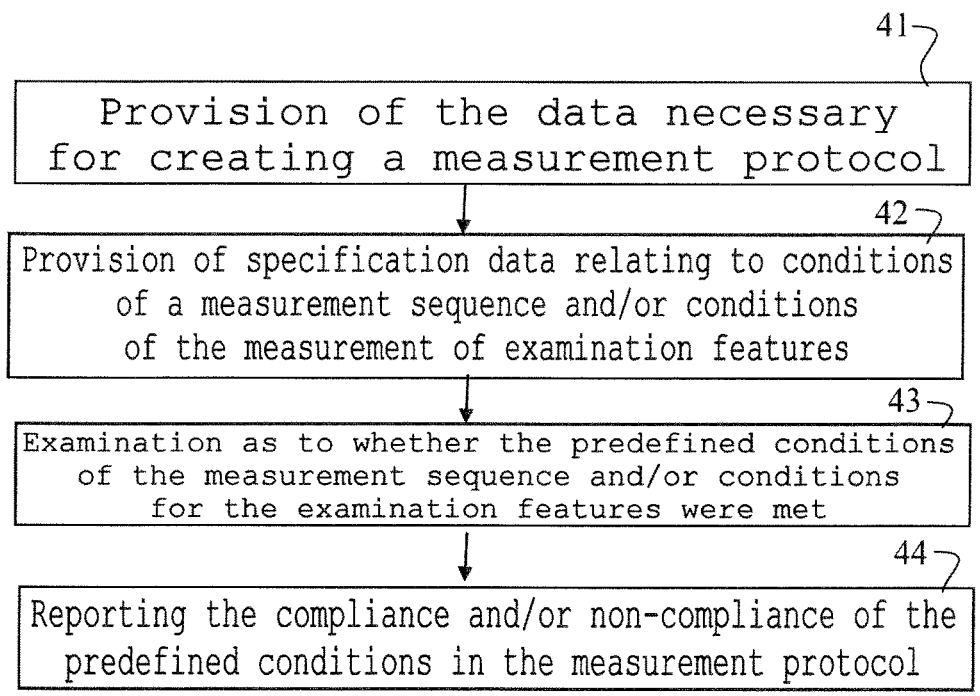
FIG. 5 shows a pure schematic of the method steps for creating a measurement protocol.

The concrete creation of the measurement protocol shall now be explained in concrete terms in connection with FIG. 5, which illustrates the steps necessary for creating the measurement protocol.

In step 41, first the data which are necessary for creating the measurement protocol and which were generated on the basis of the measurement sequence by the coordinate-measuring machine 19 are made available. This was indicated, as already explained above, in FIG. 3 by way of the arrow 36. In a next step 42, specification data which specify the predefined conditions under which a measurement sequence should be performed and/or which specify the predefined conditions under which examination features should be evaluated are provided. This was indicated, as likewise already explained above, in FIG. 3 by way of the arrow 35.

The data necessary for creating a measurement protocol are then, in step 43, checked as to whether the predefined conditions according to the specification data 26 under which the entire measurement sequence should be performed (specified by stipulations 28) were met, and/or whether the predefined conditions according to specification data 26 under which individual examination features to be examined were evaluated (specified by stipulations 27) were met.

With respect to the predefined conditions according to the specification data 26 under which the entire measurement sequence should be performed (specified by stipulations 28), a check is thus carried out as to whether the individual stipulations 28a to 28d were met. A check is thus carried out, for example, as to whether according to the stipulation 28a "machine calibration," the specified time period after which the accuracy of the coordinate-measuring machine must again be checked has already elapsed. If this time period has been exceeded, the non-compliance of this condition is reported in the measurement protocol. A check is carried out in accordance with the stipulation 28b "probing system calibration" as to whether a calibration operation for ascertaining the sensor coordinates was carried out during the measurement sequence. If such a calibration operation was not carried out, the non-compliance of this stipulation is likewise reported in the measurement protocol. In addition, a check is carried out according to the stipulation 28c "temperature compensation," among others, as to whether the temperature limits for the workpiece were observed. For example, if no temperature measurement values of the workpiece temperature were recorded, this is noted in the measurement protocol. The other specification data which are generally designated by the reference sign 28d "et cetera." are also correspondingly checked.

With respect to the check as to whether the predefined conditions according to the specification data 27 under which individual examination features of the examination plan should be evaluated were met, the check proceeds differently. Here, each individual examination feature which is located in the examination plan is checked for whether it contains a reference to a measurement strategy contained in the specification data 27 for the examination feature. For the purely exemplary case of FIG. 2 where the diameter D of the hole 5 on the workpiece 6 is intended to be determined as a single examination feature, the examination plan 49 contains a reference to the measurement strategy 27a "measurement strategy R100D-F." On the basis of this reference, the program first determines that a reference to a predefined measurement strategy exists. Next, the program checks whether all stipulations of the "measurement strategy R100D-F" were in fact met. For example, it checks whether the "probing strategy Z100D-F" according to reference sign 27b (measurement of a circle or a cylinder), to which the "measurement strategy R100D-F" makes reference, was complied with. If, for example, the program determines that the hole depth of the hole 5 is greater than the hole diameter D and only a single circle was measured for the hole, the program determines a deviation with respect to the strategy stipulation 27b "probing strategy Z100D-F." This deviation is then in turn output in the measurement protocol 18.

In a last step, having the reference sign 44 (see FIG. 5), the measurement computer 17 then creates a measurement protocol in the form of an electronic document, in which the compliance and/or non-compliance of the individual conditions in accordance with the stipulation data is documented in the measurement protocol.

Optionally, the electronic document can also be provided with a certificate for ensuring the authenticity of the electronic document. The electronic document should preferably be signed by the signature in a fashion which is protected against falsification.

Figure 6:
FIG. 6 shows an illustration of a measurement protocol 18.

FIG. 6 now shows purely by example a measurement protocol 18 which is produced according to a method according to the invention and which illustrates the above-described, purely exemplary checking of the workpiece 6 illustrated in FIG. 2 according to a method according to the invention. As is shown in this respect above in detail in connection with FIGS. 3 and 4, the diameter D of the hole 5 in the workpiece 6 illustrated in FIG. 2 is ascertained according to the measurement strategy R100D-F.

The reference sign 50 here designates the protocol header. The title "Attachment body having shaft receiving hole" here is a designation of the workpiece 6 which was chosen by the user of the coordinate-measuring machine and which he has entered into the examination plan 49 of the workpiece 6. The date "07.13.2014" designates the date on which the measurement points were recorded.

The table designated with the reference sign 60 here illustrates fundamental information relating to the single evaluated examination feature, specifically the diameter D of the hole 5 shown in FIG. 2. Illustrated with the reference sign 51 is here a purely schematic illustration of an examination feature "diameter hole," which serves only for the simplified orientation of the user of the coordinate-measuring machine. Shown with the reference sign 52 is a description of the examination feature. The designation "diameter hole" is here a designation of the examination feature that was freely chosen by the user of the coordinate-measuring machine and was entered in the examination plan 49. The text "measurement according to R100D-F," in contrast, uniquely specifies the applied measurement strategy of the examination feature and thus also what type of examination feature it is. As described in detail above in connection with FIG. 3, the measurement strategy "R100D-F" is a measurement strategy for determining the diameter of a hole. The designation "OT 10.3" provided with the reference sign 53 designates the upper tolerance limit of the diameter in millimeters, that is, 10.3 mm. The designation "UT 10.1" provided with the reference sign 54 designates the lower tolerance limit of the diameter in millimeters, that is, 10.1 mm. The designation "IST 10.13" provided with the reference sign 55 designates the actually measured diameter in millimeters, that is, 10.13 mm.

The text with the title "measurement strategy documentation" designated with the reference sign 56 serves for outputting information which determines whether the predefined conditions under which examination features should be evaluated were met. As can be seen from the sentence "All measurements were performed according to the strategy catalog »Mustermann« of 01.01.2013," there are obviously specification data (strategy catalog »Mustermann«) which were produced on 01.01.2013 and which contain the applied measurement strategy "R100D-F." The sentence additionally shows at the same time that the currently performed measurements also correspond to these specification data. This "strategy catalog »Mustermann«" thus contains the specification data which specify predefined conditions under which the examination features should be evaluated.

The sentence "The strategy catalog of 01.01.2013 was checked for validity (signature no. MMVP-1783-22 of 04.01.2013)," in contrast, shows that the specification data are checked, valid specification data whose validity is evidenced by a certificate "MMVP-1783-22" of 04.01.2013 (the abbreviation MMVP here stands for "Mustermann Validierungsprozedur" ("Mustermann validation procedure")).

The text, designated with the reference sign 57, with the title "Workflow" serves for outputting information which specifies whether the predefined conditions under which a measurement sequence should be performed were met. The sentence "The workflow corresponded to the workflow specification »Mustermann measurement and monitoring« of 01.01.2013" here confirms that all the conditions what are predefined in the specification data (workflow specification »Mustermann measuring and monitoring« of 01.01.2013) under which a measurement sequence should be performed were met. This "workflow specification »Mustermann measuring and monitoring«" thus corresponds to the specification data which specify predefined conditions under which a measurement sequence should be performed.

The next sentence fragment "The measuring machine was in an enabled state" here confirms that the stipulations according to the "machine calibration" annotated in FIG. 3 with the reference sign 28a were complied with. The sentence fragment "the sensor system calibration was carried out according to the workflow specification" confirms that the "probing system calibration," which is designated in FIG. 3 with the reference sign 28b, was performed according to the stipulations. The sentence "The workpiece temperature was 22° C. and was within the given limits (19° C.<Tw<23° C.)" confirms that the stipulations which are designated in FIG. 3 with the reference sign 28c "temperature compensation" were complied with.

The last sentence "The workflow specification »Mustermann measurement and monitoring« of 01.01.2013 was checked for validity (signature no. MMVP-081.5-41 of 04.01.2013)" in turn confirms that the specification data are checked, valid specification data whose validity is evidenced by certificate "MMVP-081:5-41" of 04.01.2013.

In tables 58 and 59, further data are given which contain details relating to the measured workpiece 6 and to the examination feature that is evaluated thereon ("diameter hole"). These tables are not shown in their entirety in the measurement protocol 18 in FIG. 6 and are meant to give only an approximate impression of the form in which the information relevant for the measurement of the examination features could be shown in measurement protocol 18.

The measurement protocol 18 shown in FIG. 6 here shows the state when a valid measurement of the workpiece 6 was performed. For the case that, for example, the predefined conditions under which individual examination features to be examined should be evaluated were not met, corresponding indications would appear in the text block 56 with the title "Measurement strategy documentation." If for example one of the examination features does not make reference to a valid measurement strategy in the specification data, a corresponding indication would be given. If furthermore one of the examination features makes reference to a valid measurement strategy in the specification data, but this measurement strategy was not complied with, a corresponding indication would likewise be given.

For the case that for example the predefined conditions under which a measurement sequence should be performed when not met, a corresponding indication would be given under the text block 57 with the title "Workflow." If, for example, the stipulation with the reference sign 28a "machine calibration" of FIG. 3 was not complied with, because the last check of the accuracy of the coordinate-measuring machine took place a longer time ago than is permissible, an indication to this effect would be given here.

Figure 7:
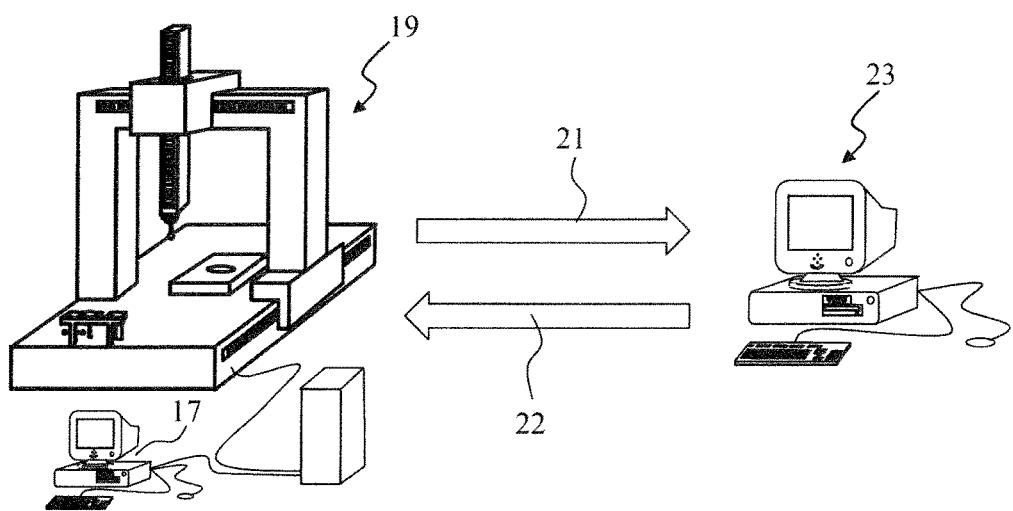
FIG. 7 shows the coordinate-measuring machine 19 of FIG. 1, wherein the measurement protocol 18 is not created in the measurement computer 17 of the coordinate-measuring machine 19 but in a computer 23 which is remote from the coordinate-measuring machine.

FIG. 7 shows in principle a second embodiment of a method according to the invention, in which the measurement protocol is produced in a computer 23 which is remote from the coordinate-measuring machine 19. The coordinate-measuring machine 19 which can be seen in FIG. 7 here in principle corresponds to the coordinate-measuring machine 19 of FIG. 1 with the small difference that the measurement protocol 18 in the present embodiment is not created on the measurement computer 17 of the coordinate-measuring machine 19, as was explained above in connection with FIG. 1, but that the measurement protocol 18 is instead created by a computer 23 which is remote from the coordinate-measuring machine 19. To provide the data necessary for creating a measurement protocol 18 in the computer 23, the data are now passed from the coordinate-measuring machine 19 to the computer 23 via a data connection 21. The method explained in connection with FIG. 5 for creating a measurement protocol 18 now takes place in the computer 23. As soon as the measurement protocol 18 has been created by the computer 23, this measurement protocol which was produced by the computer 23 is transmitted back to the coordinate-measuring machine via a data connection 22. The data connections 21 and 22 can here be data connections of a variety of forms. For example, transmission is possible via an ISDN line or, in the simplest case, via the Internet. The data connections 21 and 22 are of course preferably a common data connection.

In the case of the embodiment according to FIG. 7, the function "create measurement protocol", designated with the reference sign 33, of the measurement program 24 (see FIG. 3) is thus implemented in the form of a separate program which is executed on the computer 23. In this case, the measurement program 24 which is executed on the measurement computer 17 now only performs the functions having the reference signs 29 to 32 which are described in connection with FIG. 3 (creating the examination plan, creating the measurement sequence, performing the measurement sequence and recording the measurement results, and evaluation of the examination plan on the basis of the measurement results). The data, which were created by the functionality "evaluate examination plan on the basis of the measurement results," designated with the reference sign 32, and which are necessary for creating the measurement protocol 18, in contrast, are transmitted to the computer 23 via the data connection 21 and here provided for the program for producing the measurement protocol 18 on the computer 23. The program executed on the computer 23 for producing the measurement protocol then produces the measurement protocol 18, which is transmitted back to the measurement computer 17 via the data connection 22. This program must of course have complete access to all the specification data 26 (see FIG. 3). In order to automate this described interaction between the measurement program 24 of the measurement computer 17 and the program for creating the measurement protocol on the computer 23, there are a multiplicity of possibilities, such as for example the interaction via remote procedure calls, via web services, via CORBA or other technologies.

The data which are necessary for creating the measurement protocol 18 and the finished measurement protocol 18 can of course alternatively also be exchanged between the measurement computer 17 and the computer 23 in the form of electronic files via a data carrier.

With respect to the computer 23 (and similarly of course also the measurement computer 17), which should be mentioned at this point for the sake of completeness is that it can be, purely by example, a personal computer.

With respect to the coordinate-measuring machine 19 it is once again noted that it should be interpreted broadly. In addition to the coordinate-measuring machines mentioned in the above-cited book "Koordinatenmesstechnik, Flexible Strategien far funktions- and fertigungsgerechtes Prüfen" by Albert Weckenmann, also included in the term should be in particular machines which, although not designed primarily as coordinate-measuring machines, are configured to operate like a coordinate-measuring machine. Known are for example robot arms with hinge joints, to which a sensor for capturing the workpiece surface (for example a stripe projection sensor) is attached in place of a tool, or machine tools on which a sensor for capturing the workpiece surface (for example a tactile sensor) is attached in place of a machining tool. Also known for example are hexapod mechanisms, on which a sensor for capturing the workpiece surface (for example a tactile sensor) is attached in place of a machining tool.

With respect to the electronic document as which the measurement protocol is intended to be created, it should be emphasised at this location once again that a multiplicity of document types are conceivable here as well. In principle, the format of the electronic document used could be the format of text files, a file format of text processing systems, or a file format of table calculations, an XML format et cetera. However, particularly suitable formats which were created specifically for the publication of documents, such as the PDF format or the XPS format can be used.

It is understood that the foregoing description is that of the preferred embodiments of the invention and that various changes and modifications may be made thereto without departing from the spirit and scope of the invention as defined in the appended claims.

What is claimed is:

1. A method comprises creating a measurement protocol in a computer, the computer that is remote from a coordinate-measuring machine, including a non-transitory storage medium having program code stored thereon, the method further comprising the steps of:

importing data necessary for creating the measurement protocol, the data having been generated based on a measurement sequence by a coordinate-measuring machine, wherein said data were generated by the following steps:
a) recording measurement points on a surface of a workpiece using the coordinate-measuring machine according to a measurement sequence which is specified by an examination plan,
b) evaluating the examination plan using the recorded measurement points and generating the data necessary for creating the measurement protocol;

importing specification data which at least one of specify predefined conditions under which the measurement sequence is to be performed and specify the predefined conditions under which examination features are to be evaluated;

checking the data necessary for creating the measurement protocol as to whether at least one of the predefined conditions under which the entire measurement sequence is to be performed were met and the predefined conditions under which individual examination features to be examined are to be evaluated were met; and, creating the measurement protocol as an electronic document, in which at least one of a compliance and a non-compliance with individual conditions in accordance with the specification data is documented in the measurement protocol.

2. The method of claim 1, wherein the predefined conditions under which the measurement sequence is to be performed are conditions which specify a sequence of process steps to be followed when measuring the workpiece.

3. The method of claim 1, wherein the predefined conditions under which the measurement sequence is to be performed include parameter values which specify specific parameters for ascertained values which are to be complied with when measuring the workpiece.

4. The method of claim 3, wherein the parameter values comprise at least one of:
a) temperature measurement values of temperature sensors;
b) values which describe a thermal linear change of components of the coordinate-measuring machine;
c) values which describe a thermal linear change of the workpiece;
d) values which are connected to checking measurement accuracy of the coordinate-measuring machine; and,
e) values which are connected to calibration of the workpiece.

5. The method of claim 1, wherein the predefined conditions under which examination features are to be evaluated is a measurement strategy which is specified for the examination feature, wherein said measurement strategy includes at least one of the following elements:
a) references to probing strategies, in particular probing strategies for capturing geometrical elements;
b) references to evaluation strategies;
c) examination conditions, wherein, in dependence on a result of one or more examination conditions, a reference to at least one of a further measurement strategy and a further evaluation strategy is made;
d) references to further measurement strategies of examination features; and,
e) describing information which is associated with the measurement strategy for at least one of an examination feature and a single geometrical element.

6. The method of claim 5, wherein for checking whether the predefined conditions under which individual examination features of the examination plan are to be evaluated were met, each individual examination feature is checked as to whether it contains a reference to the measurement strategy for the examination feature contained in the specification data, and whether this measurement strategy, was followed.

7. The method of claim 1, wherein the predefined conditions under which examination features are to be evaluated is a measurement strategy which is specified for the examination feature, wherein said measurement strategy includes references to evaluation strategies for at least one of fitting compensation elements in, filtering the measurement points, and outlier elimination of outlier measurement points.

8. The method of claim 1, wherein the electronic document generated as the measurement protocol is provided with a signature.

9. The method of claim 8, wherein the electronic document is signed so as to be protected against falsification by way of the signature.

10. The method of claim 1, wherein the measurement protocol is produced in a computer which is remote from the coordinate-measuring machine, and wherein for providing the data necessary for creating the measurement protocol in the computer, said data are transmitted from the coordinate-measuring machine to the computer via a data connection, and wherein the measurement protocol produced by the computer is transmitted back to the coordinate-measuring machine via the data connection.

11. The method of claim 1, wherein the computer is a measurement computer of the coordinate-measuring machine.

12. The method of claim 1, wherein the computer is disposed remote from the coordinate-measuring machine.

13. A method comprises creating a measurement protocol in a computer, the computer that is remote from a coordinate-measuring machine, including a non-transitory storage medium having program code stored thereon, the method further comprising the steps of:
importing data necessary for creating the measurement protocol, the data having been generated based on a measurement sequence by the coordinate-measuring machine, wherein said data were generated by the following steps:
i) recording measurement points on a surface of a workpiece using the coordinate-measuring machine according to a measurement sequence which is specified by an examination plan,
ii) evaluating the examination plan using the recorded measurement points and generating the data necessary for creating the measurement protocol;
importing specification data which at least one of specify predefined conditions under which the measurement sequence is to be performed and specify the predefined conditions under which examination features are to be evaluated;
checking the data necessary for creating the measurement protocol as to whether at least one of the predefined conditions under which the entire measurement sequence is to be performed were met and the predefined conditions under which individual examination features to be examined are to be evaluated were met;
creating the measurement protocol as an electronic document, in which at least one of a compliance and a non-compliance with individual conditions in accordance with the specification data is documented in the measurement protocol,
wherein the predefined conditions under which the measurement sequence is to be performed are conditions which specify the sequence of process steps, which are to be followed when measuring the workpiece, and
wherein said process steps comprise at least one of:
a) performance of a calibration operation for ascertaining sensor coordinates;
b) checking whether a specified time period after which accuracy of the coordinate-measuring machine is to be checked again has already elapsed and, if said time has elapsed, checking the accuracy on a calibration workpiece;
c) recording temperature values on the coordinate-measuring machine and/or on the workpiece and checking whether a valid measurement of the workpiece is possible under the recorded temperature values; and,
d) performing a calibration operation for ascertaining a location of the workpiece.

14. A computer comprising:
a non-transient storage medium having program code stored on the computer to create a measurement protocol in the computer, the computer that is remote from a coordinate-measuring machine, said program code being configured to perform the steps of:
importing data necessary for creating the measurement protocol, the data having been generated based on a measurement sequence by a coordinate-measuring machine, wherein said data were generated by the following steps:

a) recording measurement points on a surface of a workpiece using the coordinate-measuring machine according to the measurement sequence which is specified by an examination plan,
b) evaluating the examination plan using the recorded measurement points and generating the data necessary for creating the measurement protocol;
importing specification data which at least one of specify predefined conditions under which the measurement sequence is to be performed and specify the predefined conditions under which examination features are to be evaluated;
checking the data necessary for creating the measurement protocol as to whether at least one of the predefined conditions under which the entire measurement sequence is to be performed were met and the predefined conditions under which individual examination features to be examined are to be evaluated were met; and,
creating the measurement protocol as an electronic document, in which at least one of a compliance and a non-compliance with individual conditions in accordance with the specification data is documented in the measurement protocol.

15. A coordinate-measuring machine for measuring workpieces comprising:
a computer including a non-transitory storage medium having program code stored thereon;
said computer being configured as a measurement computer for the coordinate-measuring machine;
said program code being configured to perform the steps of:
providing data necessary for creating a measurement protocol, the data having been generated based on a measurement sequence by the coordinate-measuring machine, wherein said data were generated by the following steps:
a) recording measurement points on a surface of a workpiece using the coordinate-measuring machine according to a measurement sequence which is specified by an examination plan,
b) evaluating the examination plan using the recorded measurement points and generating the data necessary for creating the measurement protocol;
providing specification data which at least one of specify predefined conditions under which the measurement sequence is to be performed and specify the predefined conditions under which examination features are to be evaluated;
checking the data necessary for creating the measurement protocol as to whether at least one of the predefined conditions under which the entire measurement sequence is to be performed were met and the predefined conditions under which individual examination features to be examined are to be evaluated were met; and,
creating the measurement protocol as an electronic document, in which at least one of a compliance and a non-compliance with individual conditions in accordance with the specification data is documented in the measurement protocol.

16. A system comprising:
a coordinate-measuring machine configured to measure a workpiece;
a computer which is separate from the coordinate-measuring machine;
said computer including a non-transitory storage medium having program code stored thereon;
said program code being configured to perform the steps of:
providing data necessary for creating a measurement protocol, the data having been generated based on a measurement sequence by the coordinate-measuring machine, wherein said data were generated by the following steps:
a) recording measurement points on a surface of the workpiece using the coordinate-measuring machine according to the measurement sequence which is specified by an examination plan,
b) evaluating the examination plan using the recorded measurement points and generating the data necessary for creating the measurement protocol;
providing specification data which at least one of specify predefined conditions under which the measurement sequence is to be performed and specify the predefined conditions under which examination features are to be evaluated;
checking the data necessary for creating the measurement protocol as to whether at least one of the predefined conditions under which the entire measurement sequence is to be performed were met and the predefined conditions under which individual examination features to be examined are to be evaluated were met; and,
creating the measurement protocol as an electronic document, in which at least one of a compliance and a non-compliance with individual conditions in accordance with the specification data is documented in the measurement protocol; and,
wherein for providing the data necessary for creating the measurement protocol in the computer, said data are transmitted from the coordinate-measuring machine to the computer via a data connection, and
wherein the measurement protocol produced by the computer is transmitted back to the coordinate-measuring machine via the data connection.

* * * * *